(12) United States Patent
Bomleny et al.

(10) Patent No.: US 10,028,437 B2
(45) Date of Patent: Jul. 24, 2018

(54) SYSTEM FOR CLEARING A FEEDER HOUSE AND BELT PICKUP

(71) Applicant: DEERE & COMPANY, Moline, IL (US)

(72) Inventors: Duane M. Bomleny, Geneseo, IL (US); Nathan E. Krehbiel, Bettendorf, IA (US)

(73) Assignee: Deere & Company, Moline, IL (US)

( * ) Notice: Subject to any disclaimer, the term of this patent is extended or adjusted under 35 U.S.C. 154(b) by 14 days.

(21) Appl. No.: 14/876,145

(22) Filed: Oct. 6, 2015

(65) Prior Publication Data

US 2017/0094906 A1   Apr. 6, 2017

(51) Int. Cl.
| | |
|---|---|
| G06F 7/70 | (2006.01) |
| G06F 19/00 | (2018.01) |
| G08G 7/00 | (2006.01) |
| G06G 7/76 | (2006.01) |
| A01D 61/00 | (2006.01) |
| A01D 41/12 | (2006.01) |
| A01D 61/02 | (2006.01) |
| A01D 89/00 | (2006.01) |
| A01D 75/18 | (2006.01) |
| A01D 41/10 | (2006.01) |
| A01D 41/127 | (2006.01) |

(52) U.S. Cl.
CPC .......... *A01D 61/008* (2013.01); *A01D 41/10* (2013.01); *A01D 41/12* (2013.01); *A01D 41/1274* (2013.01); *A01D 61/02* (2013.01); *A01D 75/182* (2013.01); *A01D 89/003* (2013.01)

(58) Field of Classification Search
CPC .... A01D 41/142; A01D 69/00; A01D 75/182; A01D 75/187; A01D 41/10; A01D 43/06; A01F 29/10; B02C 2018/164; F16H 2037/088; F16H 61/47; Y10S 56/15
USPC .......................................................... 701/50
See application file for complete search history.

(56) References Cited

U.S. PATENT DOCUMENTS

| | | | |
|---|---|---|---|
| 3,304,704 A * | 2/1967 | Lee ........................ | A01D 41/10 198/518 |
| 3,474,605 A | 10/1969 | Resetich | |
| 4,138,837 A * | 2/1979 | Love .................... | A01D 41/142 475/210 |

(Continued)

FOREIGN PATENT DOCUMENTS

| | | |
|---|---|---|
| EP | 1972190 A1 | 9/2008 |
| WO | 9932378 A1 | 7/1999 |
| WO | 2012166947 A1 | 12/2012 |

OTHER PUBLICATIONS

European Search Report in foreign counterpart application No. 16188914.2 dated Jan. 24, 2017 (9 pages).

*Primary Examiner* — Arpad Fabian-Kovacs
(74) *Attorney, Agent, or Firm* — Rathe Lindenbaum LLP

(57) ABSTRACT

A system and method of clearing a lump of cut crop material from an internal conveyor of the feeder house of an agricultural combine and an auger conveyor of a belt pickup mounted on the feeder house by ejecting the lump of cut crop material to a position forward of the auger conveyor, then shredding the lump of cut crop material by the auger conveyor and feeding the shredded portions of the lump of cut crop material into the internal conveyor, and then accelerating a belt conveyor on the belt pickup located immediately in front of the auger conveyor to its full harvesting speed.

19 Claims, 3 Drawing Sheets

(56) References Cited

U.S. PATENT DOCUMENTS

| | | | |
|---|---|---|---|
| 4,171,606 A | 10/1979 | Kerckhove | |
| 4,430,847 A * | 2/1984 | Tourdot | A01D 41/1274 474/1 |
| 4,467,590 A * | 8/1984 | Musser | A01D 41/142 56/11.2 |
| 4,663,919 A * | 5/1987 | Stroh | A01D 41/142 56/11.2 |
| 4,793,561 A * | 12/1988 | Burda | B02C 18/24 241/101.2 |
| 5,527,218 A * | 6/1996 | Van den Bossche | A01D 41/142 460/116 |
| 5,778,644 A * | 7/1998 | Keller | A01D 41/142 56/11.2 |
| 5,791,128 A * | 8/1998 | Rogalsky | A01D 41/142 56/10.9 |
| 6,247,296 B1 * | 6/2001 | Becker | A01D 41/142 460/20 |
| 6,381,932 B1 * | 5/2002 | Clauss | A01D 57/04 460/2 |
| 7,452,267 B2 * | 11/2008 | Bundy | A01D 41/1274 460/6 |
| 7,467,505 B2 * | 12/2008 | MacGregor | A01B 71/06 56/11.9 |
| 7,520,113 B2 * | 4/2009 | Johnson | A01D 41/142 460/20 |
| 7,520,452 B2 * | 4/2009 | Watano | B02C 18/0007 241/36 |
| 8,206,205 B2 * | 6/2012 | Derscheid | A01D 75/182 460/2 |
| 9,320,198 B2 * | 4/2016 | Trowbridge | A01D 75/182 |
| 2004/0093841 A1 * | 5/2004 | Clauss | A01D 41/127 56/16.4 R |
| 2005/0198936 A1 * | 9/2005 | Viaud | A01D 90/04 56/341 |
| 2007/0026910 A1 * | 2/2007 | Brome | A01D 41/127 460/6 |
| 2008/0028738 A1 * | 2/2008 | Viaud | A01F 15/106 56/341 |
| 2008/0295471 A1 * | 12/2008 | Pollklas | A01D 43/085 56/10.2 J |
| 2009/0272597 A1 * | 11/2009 | Deppe | A01D 41/127 180/315 |
| 2011/0023442 A1 * | 2/2011 | Herron | A01F 15/0705 56/341 |

\* cited by examiner

SYSTEM FOR CLEARING A FEEDER HOUSE AND BELT PICKUP

FIELD OF THE INVENTION

This invention relates to belt pickups for agricultural combines.

BACKGROUND OF THE INVENTION

Belt pickups for agricultural combines are agricultural harvesting heads that gather previously cut crop plants that have been gathered into windrows. They include an endless conveyor belt extending forward from the front of the belt pickup that lifts the windrow up and feeds it rearward into the feeder house of an agricultural combine.

The windrows vary in their height and density depending upon the bulk of the crop that was harvested and gathered. As a result of this variation, the feeder house conveyor in the agricultural combine will occasionally jam with excess cut crop material.

When the feeder house is jammed in this manner, the operator stops the forward motion of the combine and reverses the feeder house conveyor to eject the lump of cut crop material jamming the feeder house conveyor. This sends the lump forward and deposits it back into the belt pickup.

Once the lump has been ejected, the operator restarts the feeder house conveyor and the endless conveyor belt of the belt pickup.

One problem with this arrangement is that the lump of cut crop material is occasionally drawn back into the feeder house and jams the feeder house again. At this point, the operator will repeat the process of clearing the feeder house conveyor. If the lump is particularly large and this does not work, the operator may have to eject the lump, climb down from the operator's cabin and remove the lump from the belt pickup. This is a time-consuming process.

What is needed, therefore, is an improved system for clearing a feeder house and belt pickup. It is an object of this invention to provide such a system.

SUMMARY OF THE INVENTION

In accordance with a first aspect of the invention, a system for clearing a feeder house and belt pickup is provided, comprising: an agricultural combine wherein the agricultural combine comprises a feeder house, wherein the feeder house extends forward from the agricultural combine and has a feeder house belt conveyor disposed inside the feeder house, wherein agricultural combine also comprises a first operator input device; a belt pickup further comprising: a frame having an aperture through which cut crop material is conveyed, an auger conveyor supported on the frame and configured to convey cut crop material to the feeder house belt conveyor through the aperture, a first belt conveyor supported on the frame and disposed in front of the auger conveyor to convey cut crop material to the auger conveyor, a first motor coupled to the first belt conveyor to drive the first belt conveyor; a variable drive coupled to the first belt conveyor and to the auger conveyor to synchronously drive the first belt conveyor and the auger conveyor; and an ECU coupled to the variable drive and to the first motor, and to the first operator input device, and wherein the ECU in response to a signal from the first operator input device is configured to first accelerate the first belt conveyor and the auger conveyor to its operating speed in a first stage of operation, and then to subsequently accelerate the first belt conveyor to its operating speed over a first pre-programmed time delay interval in a second and successive stage of operation.

The system may further comprise a second operator input device that is coupled to the ECU, wherein the ECU is configured to immediately accelerate the first belt conveyor to its full operating speed in a time shorter than the first pre-programmed time delay interval in response to a signal from the second operator input device.

The first preprogrammed time delay interval may be between 10 and 60 seconds.

The first preprogrammed time delay interval may comprise an initial preprogrammed time delay interval portion during which the ECU is programmed to stop the first belt conveyor from rotating, and also comprises a second and subsequent preprogrammed time delay interval portion during which the ECU accelerates the first belt conveyor to its full operational speed.

The belt pickup may further comprise a second hydraulic motor and a second belt conveyor, wherein the second hydraulic motor is coupled to and drives the second belt conveyor.

The first belt conveyor may be a transfer conveyor that is disposed to receive cut crop material from a pickup conveyor and convey the received cut crop material to the auger conveyor.

The second belt conveyor may be a pickup conveyor comprising a pickup belt with a plurality of fingers extending outward therefrom, and wherein the plurality of fingers are configured to lift cut crop material from the ground.

In accordance with a second aspect of the invention a method for clearing a belt pickup and feeder house of an agricultural combine is provided, wherein the combine has a feeder house with an internal belt conveyor, and wherein the belt pickup has an auger conveyor disposed to feed the internal belt conveyor and a first belt conveyor disposed to feed the auger conveyor, the method comprising the steps of: stopping the internal belt conveyor, the auger conveyor, and the first belt conveyor; ejecting a lump of cut crop material jamming the internal belt conveyor of the feeder house by the internal belt conveyor and the auger conveyor in a reverse clearing direction; depositing the lump of cut crop material on the first belt conveyor; starting the internal belt conveyor and the auger conveyor in a forward harvesting direction after the step of depositing; waiting a first time delay interval after the step of starting; and operating the first belt conveyor in a forward harvesting direction at its full harvesting speed after the step of waiting.

The step of operating may comprise the steps of not moving the first belt conveyor for a first portion of the first time delay interval; and accelerating the first belt conveyor in a first harvesting direction to its normal harvesting speed for a second portion of the first time delay interval.

The first time delayed the interval may be between 10 and 60 seconds.

The method may further comprise the step of terminating the first time delay interval and accelerating the first belt conveyor to its normal harvesting speed in the first harvesting direction.

In accordance with the third aspect of the invention a method for clearing a lump of cut crop material from a feeder house of an agricultural combine is provided, wherein the combine has a feeder house with an internal belt conveyor, and wherein a belt pickup is supported on the feeder house and has an auger conveyor disposed to feed the internal belt conveyor, and wherein the belt pickup has a first belt conveyor disposed to feed the auger conveyor, the method comprising the steps of: stopping the internal belt conveyor, the auger conveyor, and the first belt conveyor; ejecting the lump of cut crop material jamming the internal belt conveyor of the feeder house; shredding the lump of cut crop material with the auger conveyor and gradually feeding shredded portions of cut crop material into the internal belt conveyor while the first belt conveyor is either stopped or moving at less than its full harvesting speed; and accelerating the first belt conveyor in a forward harvesting direction to its full harvesting speed after the step of shredding.

The step of ejecting may further comprise the step of depositing the lump of cut crop material onto the first belt conveyor.

DESCRIPTION OF THE PREFERRED EMBODIMENTS

The term "ECU" as used herein means a single ECU, or a plurality of ECUs connected together in a network to perform the functions described herein.

Figure 1:
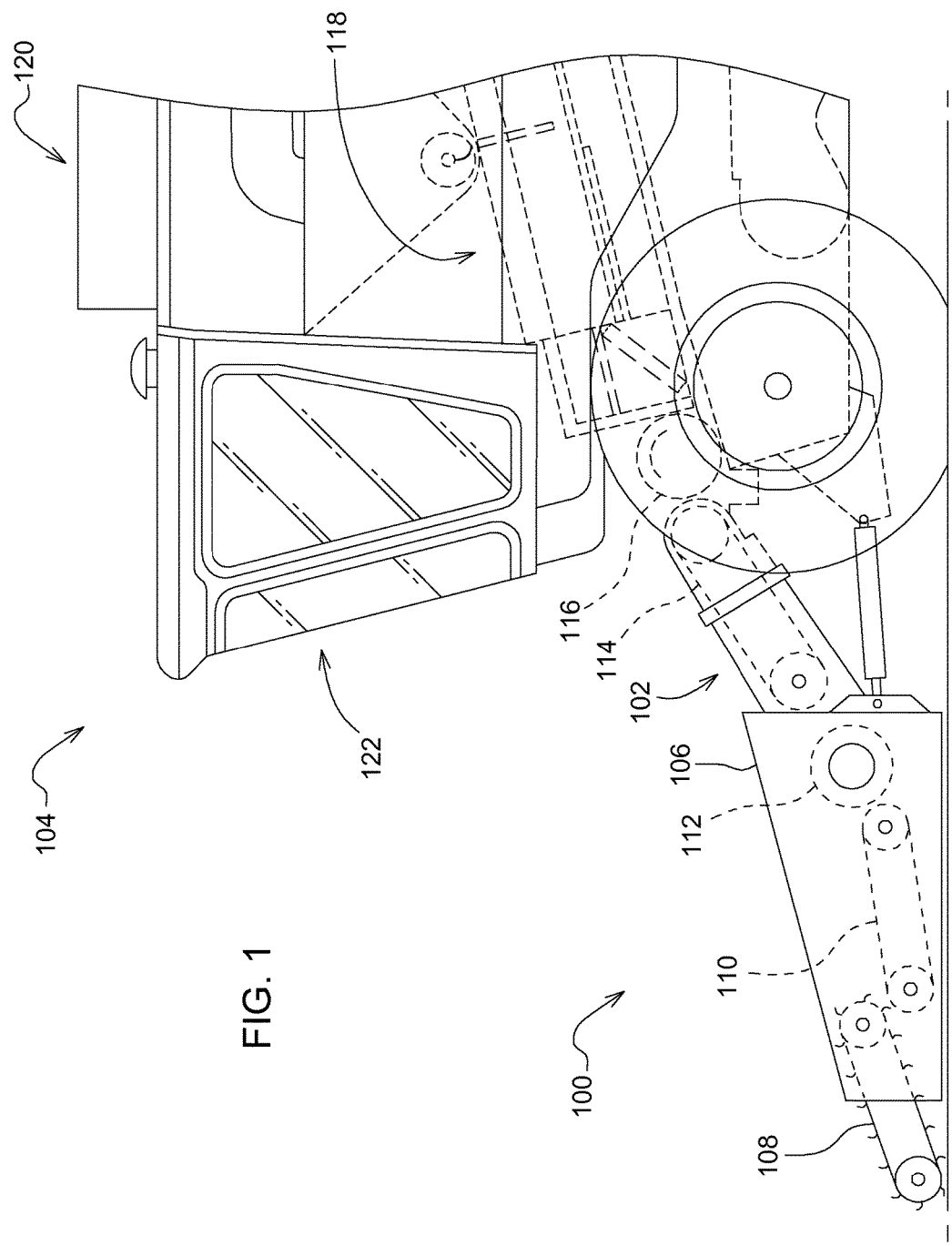
FIG. 1 is a side view of a belt pickup, feeder house and agricultural combine in accordance with the present invention.

In FIG. 1, a belt pickup 100 is supported on the forward end of the feeder house 102 of an agricultural combine 104. The belt pickup 100 comprises a frame 106, which supports a pickup conveyor 109, a transfer conveyor 111, and an auger conveyor 112.

The agricultural combine 104 carries the belt pickup 100 through the field in the direction "V". The pickup conveyor 109 engages the windrow of cut crop material, lifts it up, and carries it rearward.

The pickup conveyor 109 deposits the cut crop material on the transfer conveyor 111, which carries the cut crop rearward. The transfer conveyor 111 deposits the cut crop material in the auger conveyor 112. The auger conveyor 112 carries the cut crop material laterally inward from the sides of the belt pickup 100 to the center of the belt pickup 100, and then feeds the cut crop material through an aperture 211 (FIG. 2) in the frame of the belt pickup 100 and into the inlet of the feeder house 102.

A belt conveyor 114 in the feeder house 102 carries the cut crop upward and rearward to a drum conveyor 116, which then conveys the cut crop into a threshing and separating system 118 where grain in the cut crop material is threshed and separated from the material other than grain.

A further conveyor (not shown) carries the now-clean grain upward into a grain tank 120 in the agricultural combine 104 from whence it can be periodically transferred to a vehicle (not shown) traveling alongside the agricultural combine 104.

An operator's cabin 122 is disposed above and behind the belt pickup. The operator's cabin 122 has an operator seat and several operator controls to permit the operator to operate the agricultural combine 104 and the belt pickup 100.

Figure 2:
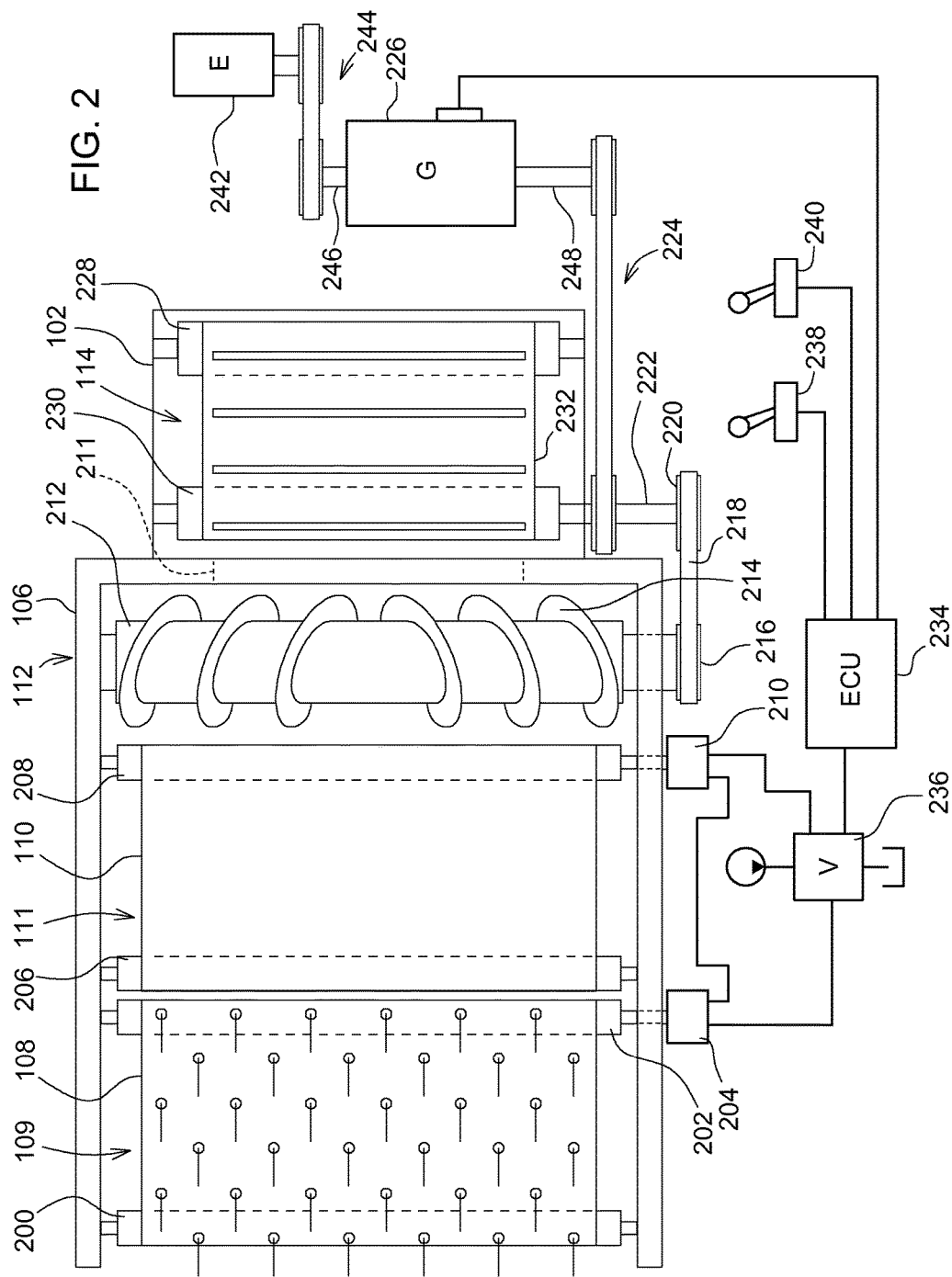
FIG. 2 is a schematic plan view of the belt pickup and feeder house of FIG. 1.

Referring to FIG. 2, the pickup conveyor 109 comprises an endless pickup belt 108 that is supported for recirculating movement about an idler roller 200 and a drive roller 202. The pickup belt 108 is made of a vulcanized rubber impregnated fabric to which small steel fingers have been attached. These fingers extend outward from the pickup belt 108 and gather up the windrow that is being harvested.

The drive roller 202 is coupled to and driven by a drive motor 204, here shown as a hydraulic motor. The transfer conveyor 111 comprises an endless transfer belt 110 that is supported for recirculating movement about an idler roller 206 and a drive roller 208. The drive roller 208 is coupled to and driven by a drive motor 210, here shown as a hydraulic motor.

The drive rollers and idler rollers of the pickup conveyor 109 and the transfer conveyor 111 are supported on the frame 106, which permits them to rotate about their longitudinal axes relative to the frame 106.

The auger conveyor 112 includes an elongate cylinder 212 upon which spiral flights 214 are fixed at each end. The elongate cylinder 212 is supported at each end on the frame 106, such that it can rotate with respect to the frame 106.

When the auger conveyor 112 rotates in a forward direction to harvest crops, the spiral flights 214 engage the cut crop material received from the rear portion of the transfer belt 110 and convey that cut crop material inwards from both ends of the elongate cylinder 212 toward a midpoint of the elongate cylinder 212. The auger conveyor 112 then pushes the cut crop material through an aperture 211 in the frame 106 where it is received by the belt conveyor 114 in the feeder house 102.

When the auger conveyor 112 is driven in a reverse direction, the cut crop material flows in a direction opposite that described in the paragraph above. The auger conveyor 112 pulls cut crop material from the aperture 211 in the frame 106 and deposits it on the rear portion of the transfer belt 110.

A pulley 216 is fixed to the elongate cylinder 212 to drive the auger conveyor 112 in rotation. The pulley 216 is driven by an endless belt 218, which is wrapped around the pulley 216. The endless belt 218 is wrapped around and driven by a second pulley 220. The second pulley 220 is fixed to a shaft 222 which is driven by another belt and pulley arrangement 224 connected to a variable speed drive 226. The belt and pulley arrangement 224 is also coupled to and drives the belt conveyor 114 which is disposed inside the feeder house 102.

The belt conveyor 114 in the feeder house 102 comprises an idler roller 228, a drive roller 230, and an endless belt 232. The ends of the two rollers are supported at the sidewalls of the feeder house 102 to rotate with respect to the feeder house 102. The drive roller 230 is driven in rotation by the belt and pulley arrangement 224. When the belt conveyor 114 is driven in a forward direction to harvest crops, cut crop material is received from the auger conveyor 112 through the aperture to 11 and underneath the drive roller 230.

In one common arrangement, the endless belt 232 comprises two endless chains to which laterally extending slats are fixed, and the drive roller and idler rollers comprise sprockets mounted on shafts that engage and drive the two endless chains.

The variable speed drive 226 is electrically coupled to an ECU 234. The ECU 234 includes at least one digital microprocessor, an internal memory to store programmed instructions and working variables for the digital microprocessor, and driver circuits for controlling the valve 236 and the variable speed drive 226. The variable speed drive 226 may be a gearbox, a continuously variable transmission, or other mechanical or electrical device in which the direction (and preferably the speed) of the output shaft 248 can be varied under the control of ECU 234.

The pulley 216, the belt 218, the pulley 220, the shaft 222, the belt and pulley arrangement 224, the variable speed drive 226, and the belt and pulley arrangement 244 constitute a variable drive that couples the engine 242 to the belt conveyor 114 and the auger conveyor 112 to drive the belt conveyor 114 and the auger conveyor 112 bidirectionally (and preferably at a plurality of ECU-selectable speeds). The ECU 234 is coupled to a first operator input device 238, and a second operator input device 240. These operator input devices are configured to be manipulated by the operator and to generate operator signals. These operator signals are communicated to the ECU 234.

In this manner, the operator can signal the ECU 234 how the ECU 234 should control the valve 236 and the variable speed drive 226 in accordance with the preprogrammed digital instructions that are stored in the ECU 234, and which will be described in greater detail in conjunction with FIG. 3.

The operator input devices may comprise touchscreens, buttons, switches, dials, levers, potentiometers, shaft encoders, variable resistors, or the like.

An engine 242 of the internal combustion type is drivingly coupled to the variable speed drive 226. They are coupled by a belt and pulley arrangement 244. The engine 242 drives the input shaft 246 of the variable speed drive 226, which (through a sequence of internal gears) drives the output shaft 248 of the variable speed drive 226. The output shaft 248 can be selectively engaged, disengaged, driven in a first direction of rotation, driven in a second direction of rotation opposite the first direction of rotation, and driven at a plurality of speeds in both directions. This operation is controlled by signals received from the ECU 234.

The variable speed drive 226 is connected to and drives both the belt conveyor 114 in the feeder house and the auger conveyor 112. "Synchronously" as used herein means that whenever one of the two conveyors is driven in a forward direction, the other is driven likewise in a forward direction, whenever one of the two conveyors is driven in a reverse direction, the other is driven likewise in the reverse direction, whenever one of the conveyors is accelerated or decelerated, the other conveyor likewise accelerates or decelerates. In the arrangement illustrated herein, the speeds of the two conveyors may differ, but they differ proportionately.

Thus, when the ECU 234 controls the speed and direction of one of the belt conveyors 114 in the auger conveyor 112, it controls the speed and direction of the other conveyor as well.

Valve 236 is coupled to the ECU 234 and is driven by the ECU 234. Valve 236 is a proportional control hydraulic valve capable of selectively setting and controlling both the speed and direction of fluid flow through the hydraulic motor 204 and the hydraulic motor 210 in response to signals received from the ECU 234. The hydraulic motor 204 and the hydraulic motor 210 are connected in a series hydraulic circuit with each other and with the valve 236. Both the hydraulic motors move in the same direction (either forward or reverse) and at the same (or proportionate) speeds.

Figure 3:
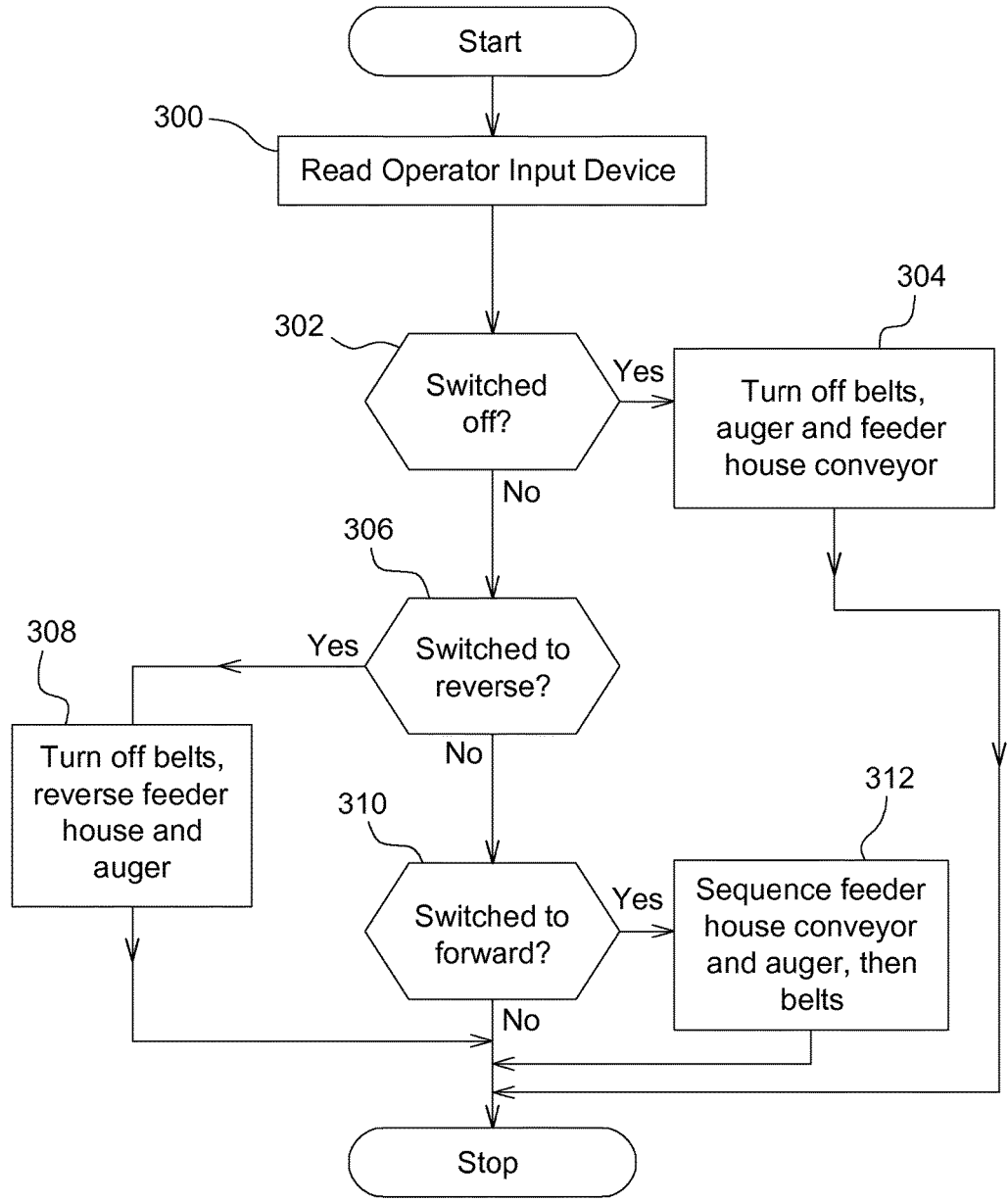
FIG. 3 is an operational flowchart of the system for clearing the feeder house and belt pickup.

FIG. 3 illustrates a preferred mode of operation of the ECU 234. It illustrates a programmed loop that is periodically executed several times per second when the agricultural combine 104 is traveling through the field harvesting crops. This programmed loop is stored in the form of digital instructions in the memory circuits of the ECU 234.

At the start of the loop in step 300 the ECU 234 reads a signal from the first operator input device 238 to determine whether the operator has manipulated it.

In step 302, the ECU determines from the signal from the operator input device 238 whether the operator has requested that the belt pickup 100 be turned off.

If the ECU 234 determines that the answer is "yes" in step 302 (i.e. the operator requested that the belt pickup 100 be turned off), the ECU continues to step 304 in which it signals the valve 236 to stop hydraulic fluid flow through the hydraulic motors 204 and 210, to thereby stop the motors, and the pickup conveyor 109 and the transfer conveyor 111 which are driven by the motors. The ECU 234 also signals the variable speed drive 226 to stop rotating the output shaft 248, and thereby stop the auger conveyor 112 and the belt conveyor 114.

If the ECU 234 determines that the answer is "no" in step 302 (i.e. the operator did not request that the belt pickup 100 be turned off) the ECU then proceeds to step 306.

In step 306 the ECU 234 determines from the signal whether the operator has requested that the belt pickup 100 be reversed. The operator does this when the belt conveyor 114 in the feeder house has become jammed with a lump of cut crop material.

If the ECU 234 determines that the answer is "yes" in step 306 (i.e. the operator has requested that the belt pickup 100 be reversed), the ECU then continues to step 308 in which it signals the valve 236 to stop the hydraulic motors 204 and 210 and thereby stop the pickup conveyor 109 and the transfer conveyor 111. The ECU also signals the variable speed drive 226 to shift the auger conveyor 112 and the belt conveyor 114 into reverse. This causes the variable speed drive 226 to start moving the belt conveyor 114 and the auger conveyor 112 in a reverse direction of rotation. This sends the lump of cut crop material plugging the feeder house 102 toward the auger conveyor 112, then through the auger conveyor 112, and then deposits the lump of cut crop material onto the trailing portion of the transfer belt 110 (which has been stopped).

If the ECU 234 determines that the answer is "no" in step 306 (i.e. the operator has not requested that the belt pickup 100 be reversed), the ECU continues to step 310.

In step 310, the ECU 234 determines whether the signal from the operator input device 238 indicates that the operator has requested that the belt pickup 100 be operated in a forward direction (i.e. in a direction to harvest crops).

If the ECU 234 determines that the answer is "yes" in step 310 (i.e. the operator just requested that the belt pickup 100 be operated in a forward direction), the ECU 234 continues to step 312.

In step 312, the ECU 234 sequences the startup of the pickup belt 108, the transfer belt 110, the auger conveyor 112, and the belt conveyor 114 in the following manner.

In step 312, the ECU 234 first starts the auger conveyor 112 and the belt conveyor 114 in the feeder house 102 turning in a forward direction. For a typical agricultural combine 104, the two conveyors achieve full harvesting speed in 2-5 seconds.

The ECU 234 does not immediately start up the pickup belt 108 and the transfer belt 110, however. Instead, the ECU 234 delays the startup of the pickup belt 108 and the transfer belt 110 for a short period of time, on the order of 10-60 seconds. The short period of time depends upon the type of crop material being harvested, the size of a typical lump of that crop material, and the specific dimensions of the belt pickup 100.

As the inventors have discovered, one of the primary problems causing the belt conveyor 114 in the feeder house 102 to become jammed all over again is the fact that the lump of cut crop material ejected onto the transfer belt 110 (in step 308) is fed too rapidly back into the auger conveyor 112 and the belt conveyor 114 in the feeder house 102.

By delaying the startup of the pickup belt 108 and the transfer belt 110, the lump of cut crop material can be torn apart by the auger conveyor 112 and be fed gradually into the feeder house 102 at a rate that does not cause the feeder house 102 to become immediately plugged up again.

Third, after the initial startup delay of the pickup belt 108 and the transfer belt 110, the ECU 234 automatically increases the speed of the pickup belt 108 and the transfer belt 110 to full harvesting speed.

There are several ways that the ECU 234 can delay the startup of the pickup belt 108 and the transfer belt 110.

In one configuration of step 312 the ECU 234 keeps the pickup belt 108 and the transfer belt 110 stopped for a first predetermined period of time (on the order of 10-30 seconds), which is typically several seconds after the auger conveyor 112 and the belt conveyor 114 have reached full operational speed. The ECU 234 then gradually accelerates the pickup belt 108 and the transfer belt 110 in a forward direction for a second predetermined period of time (on the order of 10-30 seconds) until the pickup belt 108 and the transfer belt 110 reach full harvesting speed.

In another configuration of step 312, the ECU 234 can start the pickup conveyor 109 and the transfer conveyor 111 operating in a forward direction at a much reduced speed such that the transfer belt 110 very slowly feeds the lump of cut crop material into the auger conveyor 112 for shredding. At this much reduced transfer belt speed, on the order of a few inches per second, the auger conveyor 112 will still shred the lump of cut crop material, but at a slightly faster rate than it would shred the lump of cut crop material if the transfer belt 110 was completely stopped.

Whether the transfer belt 110 is completely stopped in step 312 for an initial predetermined time interval as in the first configuration, or if it is inched forward at a much reduced speed that gradually increases as in the second configuration, the benefit is the same: by preventing the transfer belt 110 from operating at full forward operational speed immediately, the auger conveyor 112 has time to tear the lump of cut crop material apart and feed it more gradually into the feeder house 102, and by feeding it more slowly, significantly reduce the likelihood that the feeder house 102 will be immediately jammed all over again.

On occasion, the lump of cut crop material that had previously jammed the feeder house and has been ejected from the auger conveyor 112 may be quite small, or it may be shredded very quickly.

In this case, there is no reason for the operator to continue the gradual startup of the pickup conveyor 109 and the transfer conveyor 111. Instead, the operator would prefer to bring both conveyors up to full speed as quickly as possible.

To provide this capability of aborting the gradual, staged startup performed in step 312, the ECU 234 is programmed to respond to the operator input device 240 as the ECU 234 performs the staged startup process of step 312.

If the operator manipulates the second operator input device 240 while the ECU 234 is executing step 312, the ECU 234 is configured to immediately accelerate the pickup conveyor 109 and the transfer conveyor 111 to full harvesting speed with no delay.

The claims define the invention, which is not limited to the specific embodiment or embodiments described herein. Obvious variations of the specific embodiment shown herein will be apparent to one skilled in the art.

For example, rather than the variable speed drive, belts, pulleys, internal combustion engine arrangement to provide bidirectional rotary motion at variable speeds, one or more hydraulic motors can be provided. Multiple belts with multiple pulleys of varying diameters can be selectively tensioned and released in order to change the speed and/or direction of the conveyors. Multiple hydraulic or electric motors operating in different directions can be selectively engaged and disengaged and their speed changed by proportional control valves and electric drive circuits to provide both variable speed control and direction control. Further, these motors can be connected directly to the conveyors. A single hydraulic motor that can be driven bidirectionally driven at variable speed can be coupled to the conveyors.

As another example, the pickup belt and the transfer belt can be driven by pulley and belt arrangements (which include sprocket and chain arrangements) coupled to electric or hydraulic motors. Instead of two motors, one motor (electric or hydraulic) can be coupled to both the pickup belt and transfer belt to drive them simultaneously.

We claim:

1. A system for clearing a feeder house and belt pickup, comprising:
    an agricultural combine wherein the agricultural combine comprises a feeder house, wherein the feeder house extends forward from the agricultural combine and has a feeder house belt conveyor disposed inside the feeder house;
    a belt pickup further comprising:
    a frame having an aperture through which cut crop material is conveyed,
    an auger conveyor supported on the frame and configured to convey cut crop material to the feeder house belt conveyor through the aperture,
    a first belt conveyor supported on the frame and disposed in front of the auger conveyor to convey cut crop material to the auger conveyor, and
    an electronic control unit (ECU) to output control signals controlling a speed of the auger conveyor and a speed of the first belt conveyor,
    wherein the ECU operates in a harvesting mode outputting first control signals causing the first belt conveyor to be driven at a full harvesting speed, and
    wherein the ECU operates in a staged startup mode outputting second control signals causing the first belt conveyor to be either stopped or driven at a clearing speed, less than the full harvesting speed, while the auger conveyor is driven.

2. The system of claim 1, wherein the second control signals output by the ECU cause the first belt conveyor to be driven at the clearing speed while the auger is being driven.

3. The system of claim 2, wherein the clearing speed is less than 10 in./s.

4. The system of claim 3, wherein the clearing speed is ramped upward over time.

5. The system of claim 1, wherein the second control signals output by the ECU cause the first belt conveyor to be stopped while the auger is being driven.

6. The system of claim 5, wherein the second control signals cause the first belt conveyor to be stopped for at least 10 seconds while the auger is being driven.

7. The system of claim 5, wherein the second control signals cause a first belt conveyor to be stopped for no greater than 60 seconds while the auger is being driven.

8. The system of claim 5, wherein the second control signals output by the ECU cause the first belt conveyor to be stopped for at least two seconds while the auger and driven at full operational speed.

9. The system of claim 1 further comprising an operator input, wherein the ECU, in response to receiving signals from the operator input while in the staged startup mode, aborts the staged startup mode and enters the harvesting mode.

10. The system of claim 1, wherein the second control signals output by the ECU cause the first belt conveyor to be stopped for a first period of time and to be accelerating to the full harvesting speed during a second period of time.

11. The system of claim 1 further comprising an operator input, wherein the ECU initiates the staged startup mode in response to receiving signals from the operator input.

12. The system of claim 1 further comprising:
a first hydraulic motor coupled to the first belt conveyor to drive the first belt conveyor; and
a variable drive coupled to the first belt conveyor and to the auger conveyor to synchronously drive the first belt conveyor and the auger conveyor.

13. The system of claim 12, wherein the belt pickup further comprises a second hydraulic motor and a second belt conveyor, wherein the second hydraulic motor is coupled to and drive the second belt conveyor.

14. The system of claim 13, wherein the second belt conveyor is a pickup conveyor comprising a pickup belt with a plurality of fingers extending outward there from, and wherein the plurality of fingers are configured to lift cut crop material from ground.

15. The system of claim 14, wherein the first belt conveyor is a transfer conveyor that is disposed to receive cut crop material from the pickup belt and convey the receive cut crop material to the auger conveyor.

16. A system for clearing a feeder house and belt pickup, comprising:
an agricultural combine wherein the agricultural combine comprises a feeder house, wherein the feeder house extends forward from the agricultural combine and has a feeder house belt conveyor disposed inside the feeder house;
a belt pickup further comprising:
a frame having an aperture through which cut crop material is conveyed;
an auger conveyor supported on the frame and configured to convey cut crop material to the feeder house belt conveyor through the aperture;
a first belt conveyor supported on the frame and disposed in front of the auger conveyor to convey cut crop material to the auger conveyor;
a first hydraulic motor coupled to the first belt conveyor to drive the first belt conveyor; and
a variable drive coupled to the first belt conveyor and to the auger conveyor to synchronously drive the first belt conveyor and the auger conveyor; and
an electronic control unit (ECU) to output control signals controlling a speed of the auger conveyor and a speed of the first belt conveyor,
wherein the ECU operates in a harvesting mode outputting first control signals causing the first belt conveyor to be driven at a full harvesting speed, and
wherein the ECU operates in a staged startup mode outputting second control signals causing the first belt conveyor to be either stopped or driven at a clearing speed, less than the full harvesting speed, while the auger conveyor is driven.

17. The system of claim 16, wherein the belt pickup further comprises a second hydraulic motor and a second belt conveyor, wherein the second hydraulic motor is coupled to and drive the second belt conveyor.

18. The system of claim 17, wherein the second belt conveyor is a pickup conveyor comprising a pickup belt with a plurality of fingers extending outward there from, and wherein the plurality of fingers are configured to lift cut crop material from ground.

19. The system of claim 18, wherein the first belt conveyor is a transfer conveyor that is disposed to receive cut crop material from the pickup belt and convey the receive cut crop material to the auger conveyor.

* * * * *